No. 626,706. Patented June 13, 1899.
C. LIPPENS.
CYCLE.
(Application filed Aug. 20, 1898.)
(No Model.)
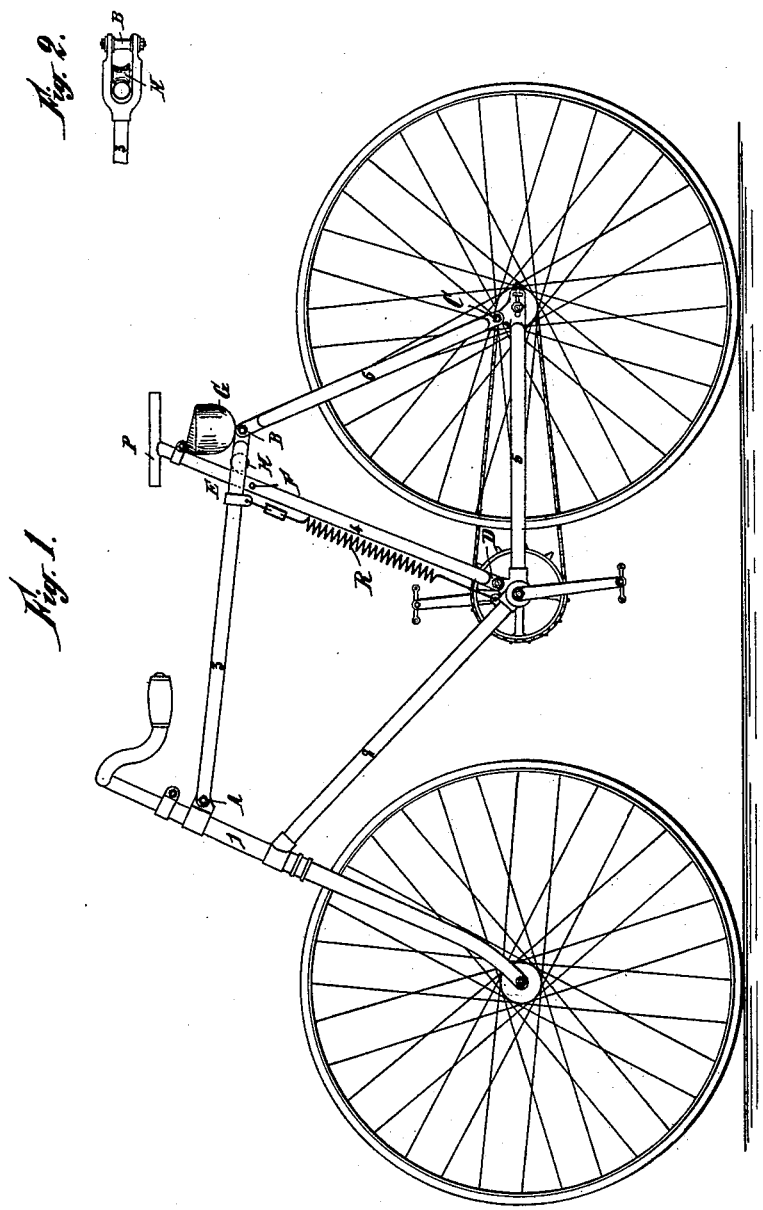
Witnesses:
E. K. Bolton
Inventor:
Camille Lippens
By
his Attorneys.

UNITED STATES PATENT OFFICE.

CAMILLE LIPPENS, OF GHENT, BELGIUM.

CYCLE.

SPECIFICATION forming part of Letters Patent No. 626,706, dated June 13, 1899.

Application filed August 20, 1898. Serial No. 689,070. (No model.)

*To all whom it may concern:*

Be it known that I, CAMILLE LIPPENS, a subject of the King of Belgium, and a resident of Ghent, Belgium, have invented a certain new and useful Improvement in Cycles, of which the following is a specification.

This invention has for its object an improved arrangement of bicycle or other cycle enabling the ordinary pneumatic tires to be entirely dispensed with, while obtaining a running which is free from shock or jolts even on the worst roads. The arrangement is essentially characterized by the ordinary rigid and inflexible frame being dispensed with and in its place a special hinged frame being adopted, the arrangement being completed by the arrangement between two suitably-selected bars of the frame of a suitable spring intended to receive and absorb any shock due to the running. The principle may be realized in various ways. A simple and inexpensive form of construction is shown as an example in the accompanying drawings.

Figure 1 is a view of the bicycle as a whole, and Fig. 2 a detail of the fork of one of the bars forming the frame.

As may be seen in the drawings, the frame is composed of a bar 1, arranged as usual; a bar 2, fixed to the bar 1, but movable on the pedal-axle; a bar 3, connected by a hinged joint A to the bar 1 and terminating at the rear in a fork, so as to give passage to a bar 4, said bar 3 being also connected by a hinged joint B to a fork 6 of the frame, said fork being itself hinged at C to the rear fork 5, which is fixed otherwise to the sleeve surrounding the pedal-axle, and, finally, the bar 4, which supports the seat-pillar P, is hinged at D, so as to be able to move in the fork which terminates the bar 3.

R is a spring of steel, india-rubber, or any other elastic material sufficiently resistant, attached by its two ends to the bars 2 and 3 and following approximately the direction of the bar 4, which carries the saddle or seat pillar. It may also be attached by its lower end to the bar 4 itself. It is evident that all jolts due to meeting obstacles while running or to the inequalities of the ground are necessarily received directly by the said spring R, which of course absorbs them, so that the cyclist experiences them very little or not at all.

A stop F, arranged as a measure of precaution on the bar 4, limits the vertical descending movement of the bar 3, and a roller H, arranged in the fork of the bar 3, guides the bar 4.

The arrangement hereinbefore described may be further completed by the arrangement on the bar 6 of an air-cushion or a suitable elastic or resilient body G; but this arrangement is not indispensable.

It is evident that the hinged jointing A of the bar 3 may be adopted for the bar 2 and that the same result would be realized. The pattern shown is only an example of numerous constructive arrangements which may be adopted, and therefore it is not considered necessary to examine these details or describe more particularly the other parts of the bicycle, such as the front fork, steering-bar, pedals, or the like, which are of the ordinary pattern.

Having now described my invention, what I claim as new, and desire to secure by Letters Patent, is—

In combination, the front forks, the steering-head 1, the top bar 3 pivotally connected to the steering-head, the bar 2 fixed to the head and extending to the crank-axle, the forks 5 connected to the crank-hanger which is movable pivotally in relation to the said axle, the rear forks 6 pivotally connected to the fork 5, the pivot B joining the bar 3 and the forks 6, the seat-standard 4 pivotally connected with the crank-hanger and the spring connecting with the upper part of the frame for forcing the same downwardly, substantially as described.

In witness whereof I have hereunto set my hand in presence of two witnesses.

CAMILLE LIPPENS.

Witnesses:
 D. LIPPENS,
 REMI VON DE WEGHA.